United States Patent [19]
Stefanik

[11] Patent Number: 6,048,014
[45] Date of Patent: Apr. 11, 2000

[54] SANITARY POP-UP ICE CREAM CONE DISPENSER AND HANDLING DEVICE AND A METHOD OF USE THEREOF

[76] Inventor: A. Louis Stefanik, P.O. Box 476, Vandergrift, Pa. 15690

[21] Appl. No.: 09/245,265

[22] Filed: Feb. 5, 1999

[51] Int. Cl.[7] .................................................. B65D 25/38
[52] U.S. Cl. ..................... 294/99.1; 294/26.5; 206/804; 426/115
[58] Field of Search .................................. 294/99.1, 100, 294/26.5, 27.1, 32, 33, 50, 50.5; 206/758, 761, 804; 426/100, 101, 115, 394

[56] References Cited

U.S. PATENT DOCUMENTS

| | | |
|---|---|---|
| 378,361 | 2/1888 | Fox . |
| 1,147,856 | 7/1915 | Gilchrist . |
| 1,303,171 | 5/1919 | Curtin . |
| 1,435,746 | 11/1922 | Schmidt . |
| 1,933,596 | 11/1933 | MacLean . |
| 2,125,385 | 8/1938 | MacLean . |
| 2,162,224 | 6/1939 | Legge . |
| 2,166,619 | 7/1939 | Becker ..................................... 426/115 |
| 2,519,271 | 8/1950 | Miller . |
| 3,417,862 | 12/1968 | Fong . |
| 3,432,027 | 3/1969 | Mueller . |
| 3,459,296 | 8/1969 | Berg ......................................... 426/115 |
| 3,481,458 | 12/1969 | Mayeaux ................................. 206/804 |
| 3,499,538 | 3/1970 | Sherard . |
| 3,920,156 | 11/1975 | Hicks ..................................... 426/115 |
| 4,069,996 | 1/1978 | Koziol . |
| 4,720,037 | 1/1988 | Alpert . |
| 4,821,906 | 4/1989 | Clark ....................................... 426/115 |
| 4,865,199 | 9/1989 | Zimmer . |
| 5,111,973 | 5/1992 | Mueller . |
| 5,143,247 | 9/1992 | Gavle . |

Primary Examiner—Dean J. Kramer
Attorney, Agent, or Firm—Nils H. Ljungman and Associates

[57] ABSTRACT

The object of the present invention is to overcome the disadvantages of the known devices and methods for handling ice cream cones by providing a simple re-usable sanitary ice cream cone handling device which is quick, easy, and convenient to use and does not require the touching of the ice cream cone by the server.

19 Claims, 11 Drawing Sheets

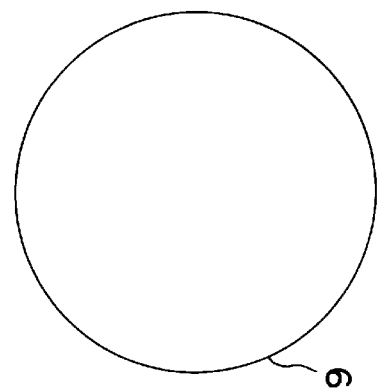
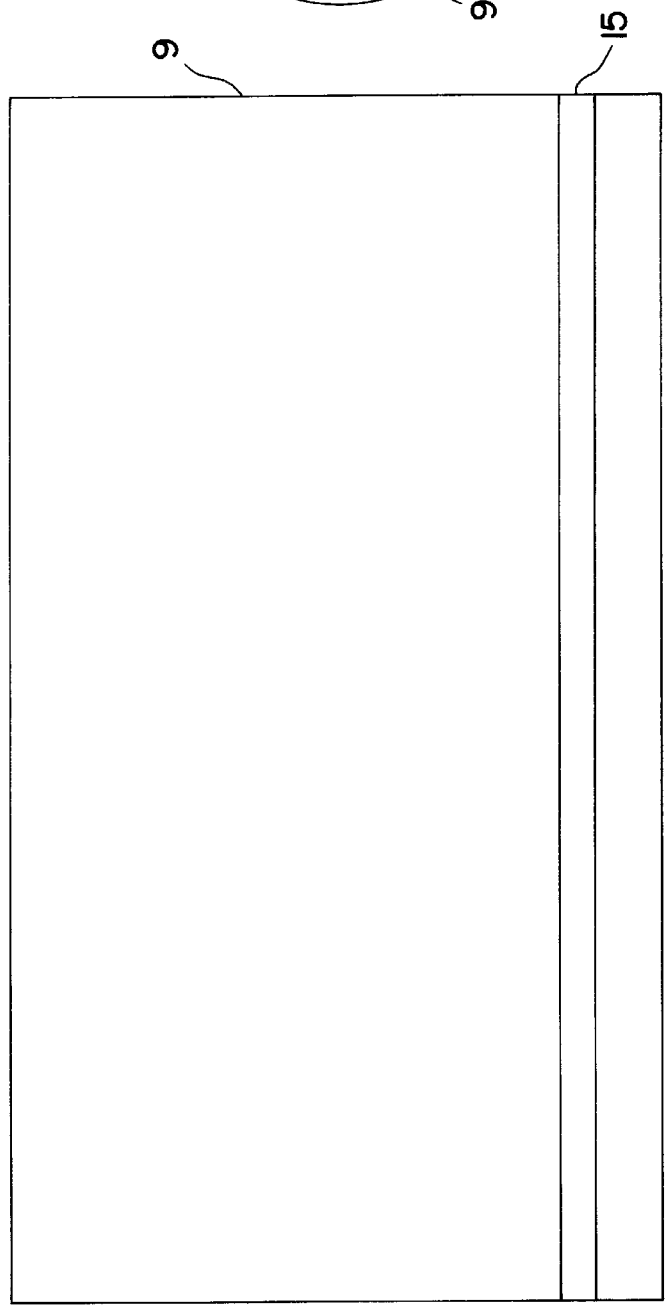

SANITARY POP-UP ICE CREAM CONE DISPENSER AND HANDLING DEVICE AND A METHOD OF USE THEREOF

BACKGROUND OF THE INVENTION

1. Field of the Invention

The present invention generally relates to a re-usable dispenser or holder for the sanitary handling of ice cream cones, including the dispensing, holding, filling and serving of the ice cream cones in a sanitary manner. In particular, this invention generally relates to a device configured to allow an ice cream cone to be dispensed from its packaging, filled and served to a consumer, without the server ever touching the actual cone.

2. Description of the Prior Art

Known devices for the sanitary handling of ice cream cones are frequently simple disposable, paper or cardboard structures, designed for a single use. For example, many ice cream sellers wrap a disposable paper or napkin around the cone prior to filling and serving the cone to the customer. U.S. Pat. No. 4,720,037 discloses a disposable sanitary jacket that fits around the outside of a cone, and is handed with the cone to the customer. Similarly, U.S. Pat. No. 1,435,746 discloses a disposable paper sanitary box-shaped cone holder, also handed with the ice cream cone to the customer. U.S. Pat. No. 2,162,224 also discloses a single-use disposable conical paper or cardboard cone holder, designed to both catch the drippage from the cone, as well as to support and elevate the cone as it is being consumed by the customer. U.S. Pat. No. 4,069,996 discloses a combination packing jacket and holder which can apparently be reused. However, this jacket does not appear to be designed to be sanitary, that is, to avoid the touching of the cone by the server.

There are a number of obvious disadvantages to these known devices. For example, these devices may not be sanitary, as they may either require the cone to be touched by the server, or can easily result in the accidental touching of the cone by the server. Notably, the need for the cone to be untouched by the server is especially important when the server is handling both cones and money, as is frequently the situation. Additionally, some of these devices may be cumbersome to use. Further, since most of these known devices are single-use products, it is apparent that a company could spend a considerable amount of money and time keeping these products in stock. This would include not only the price of the products themselves, but also the expense involved in the ordering, inventory and storage of these products. While pre-wrapped cones are also available, this pre-wrapping can significantly raise the price of these cones, and once again each wrap is only useable with a single cone.

OBJECT OF THE INVENTION

The object of the present invention is to overcome the disadvantages of the known devices and methods for handling ice cream cones by providing a simple re-usable sanitary ice cream cone handling device which is quick, easy and convenient to use, and does not require the touching of the ice cream cone by the server.

SUMMARY OF THE INVENTION

To achieve this object, the present invention discloses a reusable sanitary ice cream cone handling device which can be manufactured from easily cleaned and sanitized material, such as stainless steel. Other suitable metals and/or materials, such as a heavy plastic could possibly also be used in accordance with the present invention.

This sanitary ice cream cone handling device can have prongs or tines which can work in conjunction with a securing clip and a weight or plunger piece arrangement. The inventive device is configured to grab onto and secure an ice cream cone at least partially within a protective cylindrical housing. This cylindrical housing, rather than the cone itself, can then be grasped by the hand of the server while the cone is filled with ice cream. The invention can then release the secured cone upon the placement of the present invention upon a surface or counter, for easy removal of the ice cream cone by the customer, without the need for further touching of or contact with the inventive device. Further, since the areas of the device which contact the cone need not have been touched by either the server of the customer, the inventive device can be used repeatedly by the server.

The action of the sanitary handling device can be accomplished by a plunger apparatus which, in at least one embodiment, can include a substantially flat horizontal platform on which a plurality of preferably substantially vertically directed resilient prongs are attached. In at least one embodiment, this platform can be circular, and in at least one embodiment, this platform can be attached to a plunger bar or rod which is attached to a weight or plunger piece. This weight can be designed to be received by a corresponding recess in a base portion of the handling device when the inventive device is set on a surface. In alternative embodiments, this weight can possibly be configured in any one of many possible shapes or sizes. For example, this weight or plunger piece could be disc shaped, and fit beneath or adjacent the base portion, or the weight may be configured to form a base for the handling device when the inventive device is placed on a surface.

Likewise, in at least one possible embodiment of the present invention, the plunger apparatus' platform and prongs can be modified, or made modifiable, such that different sized or shaped cones can be used in the inventive device. For example, the plunger apparatus can be designed for various sized cones and/or designed such that either, or both, flat-bottomed cones and conically-shaped cones can be used in the inventive device. For example, the "platform" can be made conical in shape, and the prongs can be positioned to enable the device to sanitarily handle conically shaped sugar cones. Additionally, in at least one embodiment of the present invention the plunger apparatus can be configured to be interchangeable, such that one plunger apparatus can be easily removed, and a different plunger apparatus can be inserted, for example, depending upon the type or size of cone which is being filled.

When the inventive handling device is picked-up by the hand of a server, the weight can slide downward, moving the entire plunger apparatus in a downward direction as well. The server can then place the cylindrical housing of the handling device over an exposed base of the ice cream cone which is to filled. In at least one embodiment of the present invention, the plunger prongs are then capable of securely engaging the base of the cone, allowing the cone to be easily picked-up and/or removed from its packaging or stack. In another possible embodiment, a securing clip which can be attached to the outside of the cylindrical housing may also be utilized by the server to aid in the securing of the cone within the inventive device.

Once the ice cream cone has been filled by the server, the the server need merely place the present invention back onto a surface, such as a counter, whereby the weight will contact the counter causing the housing held by the server to slide downwardly over the plunger. This action thereby pops-up or elevates the cone with respect to the housing of the inventive handling device, such that the cone can now be easily removed by the customer. Because neither the cone nor any portion of the inventive device which touches the cone has been handled by the server, the server can repeatedly reuse the present invention to fill additional cones in a sanitary manner.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

Preferred embodiments of the invention are described below in reference to the accompanying drawings, wherein:

FIG. 3 shows one embodiment of possible dimensions for material, such as flat stainless steel, that could possibly be used to form the housing member;

FIG. 4 shows a top view of the flat material shown in FIG. 3;

DESCRIPTION OF THE PREFERRED EMBODIMENTS

Figure 1:
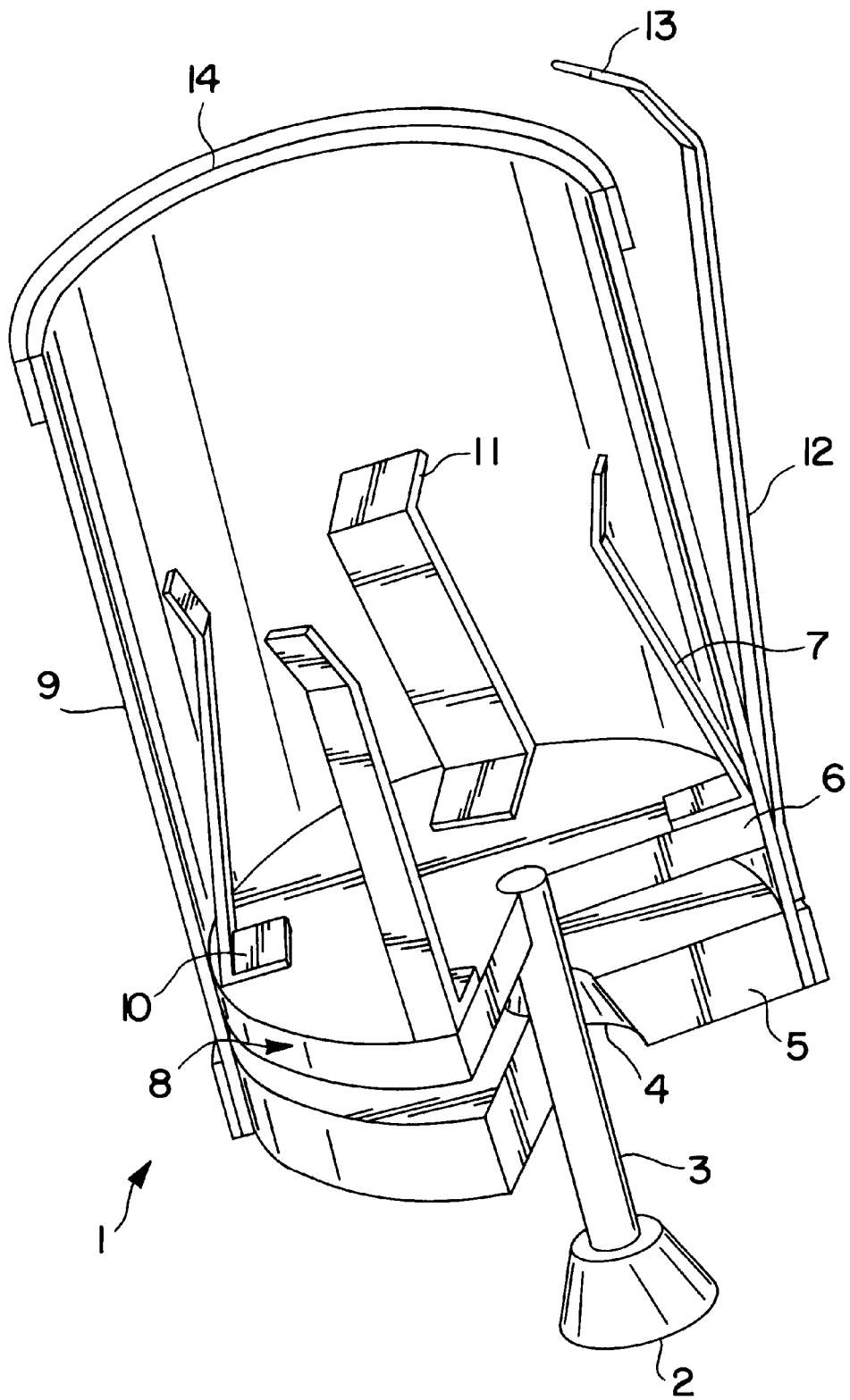
FIG. 1 shows a cross-sectional view of one possible embodiment of the present invention, in a closed or retracted state.
Figure 2:
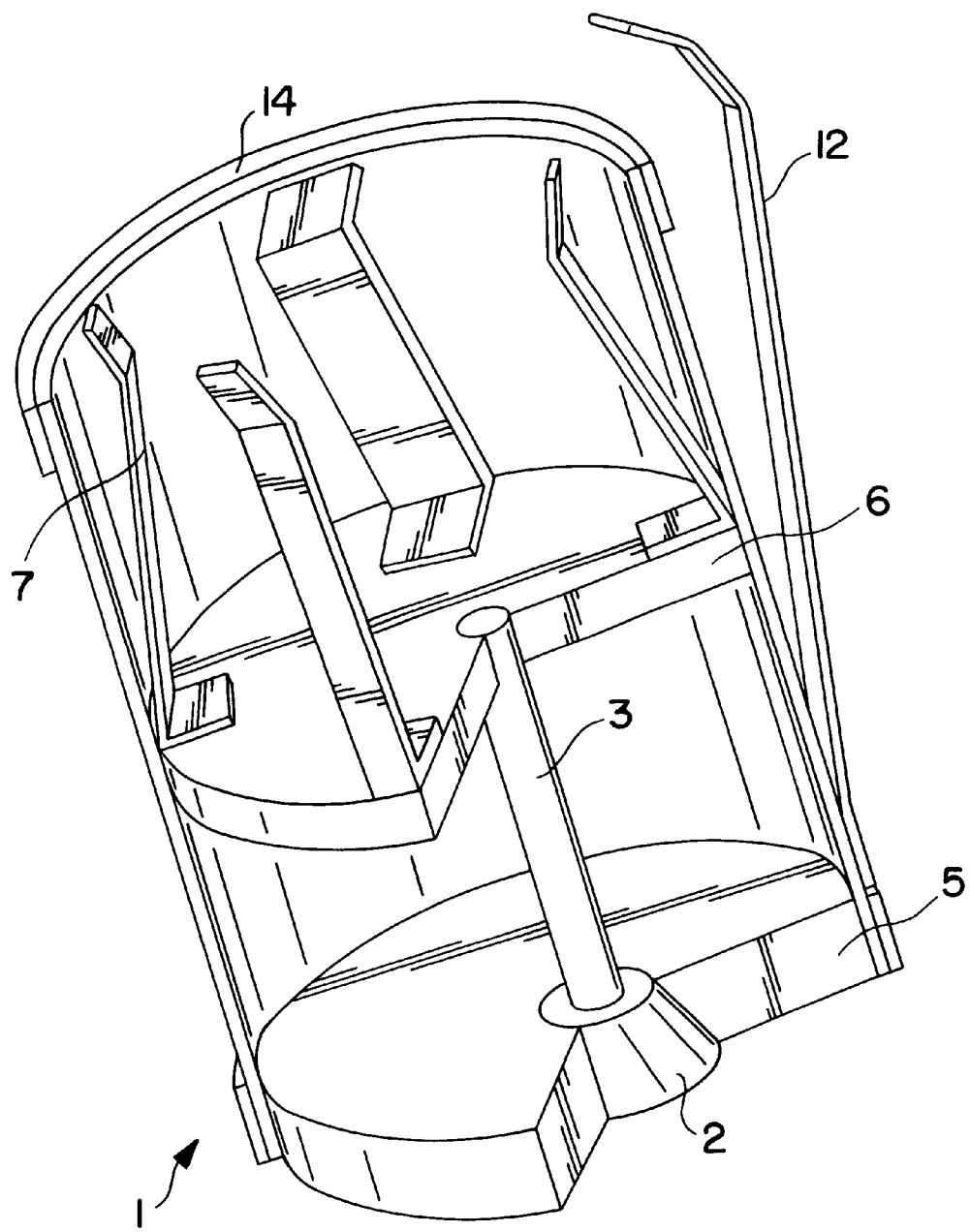
FIG. 2 shows a cross-sectional view of the same embodiment as FIG. 1, only in an extended state.

FIGS. 1 and 2 shows a cross-sectional view of one possible embodiment of the inventive ice cream cone handling device 1. This device can be formed from any sturdy material which can be re-used and can be easily cleaned, such as a metal, or other appropriate material. In the embodiment shown, a plunger piece, or weight 2, is attached to a plunger bar or rod 3, such as for example by a threaded portion (see FIG. 8). This plunger piece 2 can be frusto-conically shaped, and be designed to fit easily into a correspondingly shaped opening 4 in a base piece 5. In at least one embodiment of the present invention the base piece 5 can be substantially circular in shape. The plunger bar 3, at an end opposite to the plunger piece 2, can have attached thereto a plunger platform 6, which platform can also be substantially circular in at least one embodiment of the present invention. One or more plunger prongs 7 can be attached to the platform 6, for example by spot welding, or other suitable method of attachment. It is also possible, in another embodiment, for the platform 6 and the prongs or tines 7 to be formed as or from one continuous piece of material. The plunger piece 2, the plunger bar 3, the plunger platform 6 and the prongs 7, can together form a plunger apparatus 8 which is configured to slide up and down within a housing member 9, which housing member 9 can be substantially cylindrically shaped. The prongs 7 can be made of a resilient or flexible material, and can be bent at both their point of attachment 10 to the plunger platform 6 and at their upper ends 11 so as to form supporting, or stabilizing, structures for the ice cream cone once it is positioned within the housing 9. In an alternative embodiment, these prongs 7 can be disposed so as sufficiently snugly fit around the base of a standard cone, so as to sufficiently hold it in position within the inventive handling device 1 so as to allow the dispensing of the cone from its packaging.

In at least one embodiment, a resilient securing clip 12 can be attached to the outside of the housing member 9, for example by welding or other appropriate securing mechanisms. This securing clip 12, can also be attached to the handling device by a retainer ring 22b. In at least one embodiment, one end 20 of the securing clip 12 can first be secured to the retainer ring 22b, for example by welding the clip 12, into corresponding notch 19 in the retainer ring 22b (see FIG. 35). During the assembly of the inventive handling device 1 (see FIGS. 24–26), this retainer ring 22b, with the attached securing clip 12, can be tightly fitted over the housing 9, at the base of the handling device 1. An additional retainer clip 22a can be likewise fitted over the top edge of the housing 9 (see FIG. 26). This securing clip 12 can be configured and disposed so that it can be easily grasped and pressed by the hand of the server, so as to firmly engage a bent end portion 13 of the clip 12 with the side of an ice cream cone, and thereby hold the cone in place within the inventive handling device 1.

FIG. 1 shows the ice cream cone handling device 1 in a substantially closed or retracted state, such as would occur upon the server picking up the inventive handling device, causing the plunger piece 2, to slide out of the hole 4 and extend from the base 5 of the device 1. This would result in the entire plunger apparatus 8, sliding along with the weight 2. In the state shown (or possibly, in at least one embodiment, a more fully retracted state in which the plunger platform 6 and base piece 5 are in contact with each other), the device is in a position ready to engage an ice cream cone from the bottom. For example, the device can be used with cones which are packaged or stored in rows or stacks, with the cones nested one within another, with the bottom most cone or cones extending out of the package, thereby allowing removal of individual cones, one at a time, from the bottom of the package. These known packages are frequently mounted or positioned in an elevated manner, allowing for easy access and removal of the bottom most cone or cones. In this situation the server can easily place or slide the circular opening or mouth 14 of the extended handling device 1 around the base and sides of the cone (see FIG. 20A). The server can then depress the securing clip 12, causing the bent end portion 13 of the clip 12, to engage the side of the cone. The cone can then be easily removed from its package, filled and delivered to the customer, without the server ever touching the actual cone.

It is also possible to use the present invention to sanitarily pick-up cones from a variety of positions and/or storage locations. For example, the device can remove a cone from a stack of upside-down cones, by simply placing the device, also upside-down in a platform extended state (see FIG. 2), over the base of the uppermost cone, and sliding the handling device 1 down over the cone, thereby retracting the plunger apparatus 8. The securing clip 12 can then be used to secure the cone within the device.

FIG. 2 shows the handling device 1 in an extended state. This is the position which can result, for example, from the placing of the device 1 on a counter next to the customer. Once the weight or plunger piece 2 is brought in contact with the counter, and the securing clip 12 is released by the server, the housing 9 can be easily slid downward with the hand of the server, thereby moving the position of the prongs 7 and plunger platform 6, toward the opening or mouth 14, thus causing the ice cream cone to extend or pop-up further from the mouth 14 of the device 1. This extended position (FIG. 2), allows the customer to easily remove the ice cream cone from the handling device 1, without necessitating the touching of the device. The securing clip can be designed to be flexible to the degree necessary that the server need simply place the device 1 on the counter and remove his or her hand from the device housing 9 and clip 12, and the securing clip 12 will automatically spring back towards its original position, thereby releasing its contact with the cone.

FIG. 3 shows one embodiment of possible dimensions for material, such as flat stainless steel, that could possibly be used to form the housing member 9. As shown, the starting material can have a length of about 6.75 inches, and a height of about 3.50 inches. An indentation 15, protruding inward upon assembly, of about 1/8 inch deep can be formed approximately 3/8 of an inch from the bottom. This indentation can be used to secure the base piece 5 withing the housing 9, upon the assembly of the final device 1. FIG. 4 shows a top view of the flat material shown in FIG. 3. The width of this material can vary, however, for example, stainless steel with a width of about 1/32 of an inch would be suitable for at least one embodiment.

Figure 7:
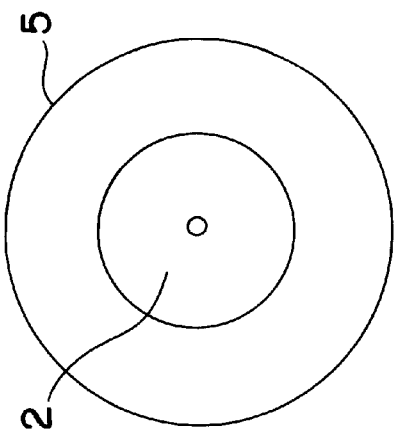
FIGS. 5–7 show a side, top and bottom view, respectively, of one possible embodiment of a base piece.
Figure 6:
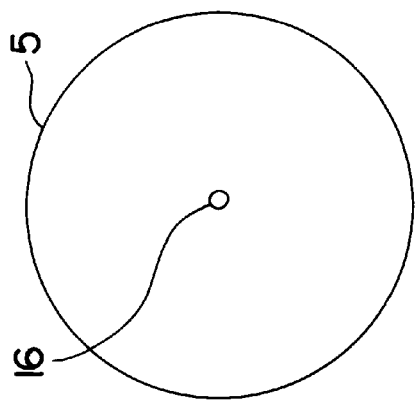
Figure 5:
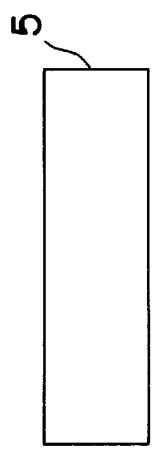
Figure 32:
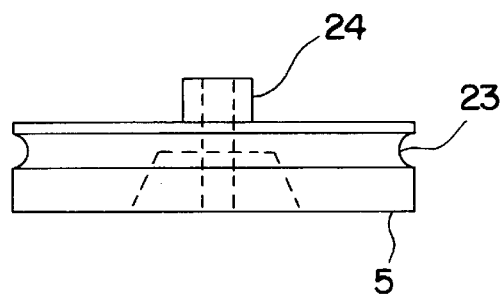
FIG. 32 shows a side view of another possible embodiment of the base piece, with additional details.

FIGS. 5–7 show a side, top and bottom view, respectively, of one possible embodiment of the base piece 5. As shown in FIGS. 7 and 32; a frustoconical hole 4 can be formed in the center of the circular base piece 5, with the widest diameter of approximately 15/16 inch at the bottom, and terminating at the top with a diameter of approximately 5/8 inch. The plunger bar 3 can be inserted through this hole 4. As shown in FIG. 5, the base piece 5 can have a height of about 1/2 inch and a diameter of about 1.875 inches, thereby enabling the bases to be easily assembled within the housing member 9, and secured in place by the indentation 15. In at least one embodiment the base piece 5 can have a corresponding indentation 23 (see FIG. 32), which is configured to engage with the indentation 15, upon the assembly of the handling device 1. In at least one embodiment, this assembly can be accomplished, at least in part, by machine assembly.

Figure 11:
FIGS. 9–11 show a bottom, top and side view, respectively, of at least one embodiment of a plunger piece or weight.
Figure 10:
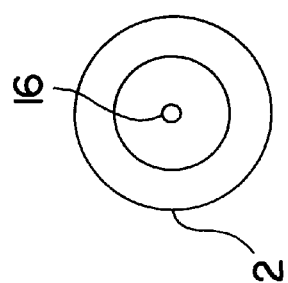
Figure 9:
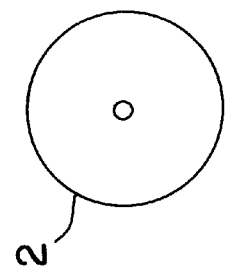
Figure 8:
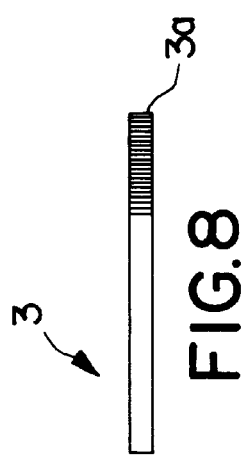
FIG. 8 shows one possible embodiment of the plunger bar or rod.

FIG. 8 shows one possible embodiment of the plunger bar or rod 3. This bar 3 can be about 1 11/16 inches long, and can include an approximately 1/2 inch threaded area 3a at one end, configured to be screwed into a corresponding hole 16 in the plunger piece 2. This type of screwed attachment can allow easy disassembly of the weight or plunger piece 2, from the bar 3, thereby allowing the remainder of the plunger apparatus 8 to be slid out of the mouth 14 of the device 1, such as for easy cleaning of the handling device 1. FIGS. 9–11 show a bottom, top and side view respectively of at least one embodiment of the plunger piece or weight 2. This piece 2 can be frustoconical in shape and of a dimension to compliment the hole 4 in the base piece 5. As shown, for example, the plunger piece 2 can have a extreme bottom diameter of about 15/16 inch to 1 inch, which can taper to a top diameter of about 5/8 inch, and a height of about 1/2 inch. A hole 16 can extend vertically through the plunger piece 2. This hole 16 can be threaded to fit one end 3A of the plunger shaft or bar 3. Other known methods for attachment of the plunger piece 2 to the plunger bar 3 are also possible, such as by welding or adhesive. The base piece 5, plunger piece 2 and plunger bar 3, can all be made of a sturdy material such as steel.

Figure 12:
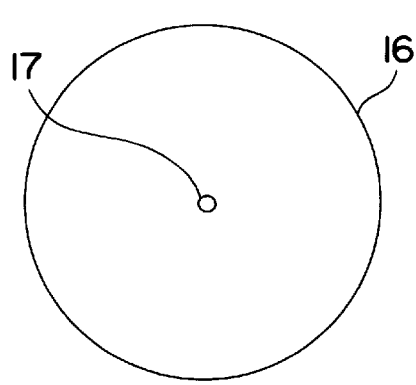
FIGS. 12 and 13 show a bottom view and a top view, respectively, of one possible embodiment of a plunger platform.

FIG. 12 shows one possible embodiment of the plunger platform 6. This platform 6 can also be made of steel, can have a thickness of about 1/16 inch. An about 1/8 inch diameter hole 17 can be formed or made in the center of the platform 6, which platform 6 can have a diameter of about 1.875 inches. The hole 17 can receive one end of the plunger bar 3, that is the end opposite of the plunger piece 2. The plunger bar 3 can then be attached to the platform 6, for example, by spot welding, or other suitable means of attachment. Attached to the upper side of the plunger platform 6, can be prongs 7. In at least one embodiment, four prongs 7 can be used.

Figure 13:
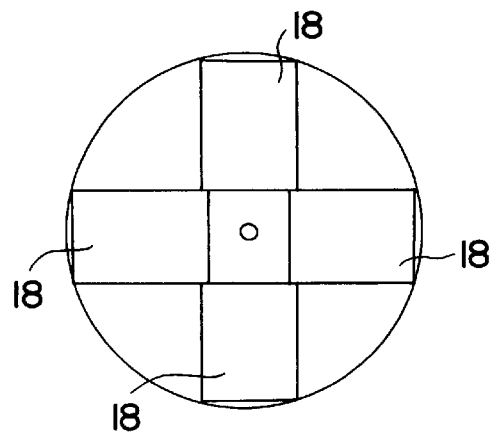
Figure 14:
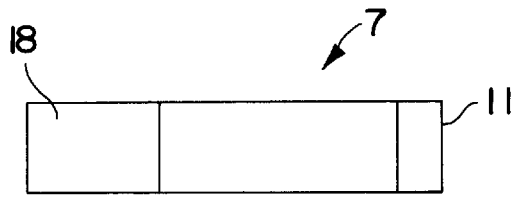
FIG. 14 shows one possible embodiment of a flattened prong.
Figure 15:
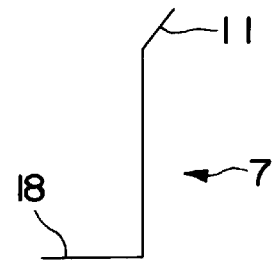
FIG. 15 shows one possible embodiment of a formed or bent prong.
Figure 16A:
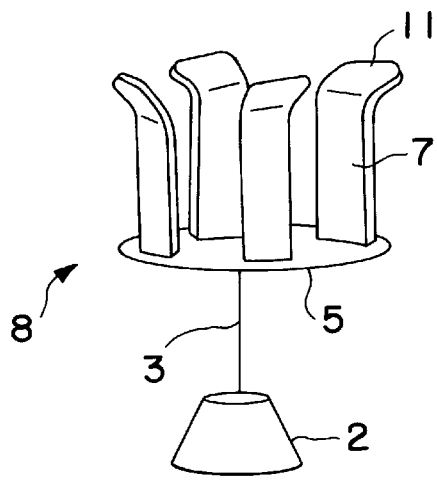
FIG. 16A schematically shows one possible embodiment of a plunger apparatus.

FIG. 14 shows a flattened prong 7, or a prong 7 prior to bending into the desired form. This embodiment shows a prong 7 approximately 1/2 inch wide, and 2 1/6 inches long. This prong 7 can also be made from flat stainless steel. As shown in FIGS. 14 and 15, at approximately 9/16 inch from one end a bend of about 90 degrees can be made to the metal, to form a base portion 18. This base portion 18 can be of varying sizes, for example as shown by the 7/16 inch measurement in FIG. 13. These prong base portions 18 can then be attached, such as by spot welding, at approximately even interval around the outside edge of the base piece 5, see FIGS. 13 and 16A. At the end of the prong 7 opposite the base portion 18, at 1/4 inch from the end, another bend of about 40 degrees can be made to obtain a bent portion 11. Once all of the prongs 7 are in place, these bent portions 11 can serve to help guide the placement of the cone base into the proper position between the prongs 7 and onto the plunger platform 6. In one possible embodiment, these prongs 7 should be formed from a sufficiently flexible material, enabling them to sufficiently snugly hold the base of the cone in place within the handling device 1. In another possible embodiment, these prongs 7 can serve primarily as a positioning guide and stabilizing structure for the cone, while the securing clip 12 serves as the apparatus for holding the cone in position within the handling device 1.

Figure 16B:
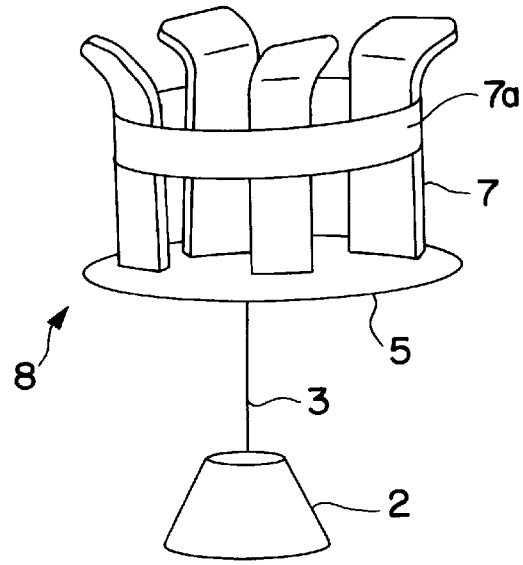
FIG. 16B schematically shows another possible embodiment of a plunger apparatus.

As shown schematically in FIG. 16B, in at least one embodiment an additional ring 7a can be placed around the prongs 7. This ring 7a can give added stability to a cone held therein, and in one embodiment can be approximately 3/8 inch wide. This ring 7a can be secured to the prongs 7 by any suitable manner, such as spot welding. Further, the exact placement of the prongs 7 on the platform 6 can vary, in accordance with the desired size of the space between the prongs, such as to correspond with the size or shape of the cones with which the device will be used. For example, in at least one embodiment, the prongs 7 can be attached approximately 3/16 inch from the outer edge of of platform 6 having a diameter of approximately 2 inches.

These prongs 7 can conceivably also be formed as one piece with the platform 6, from one continuous sheet of metal.

Figures 17, 18:
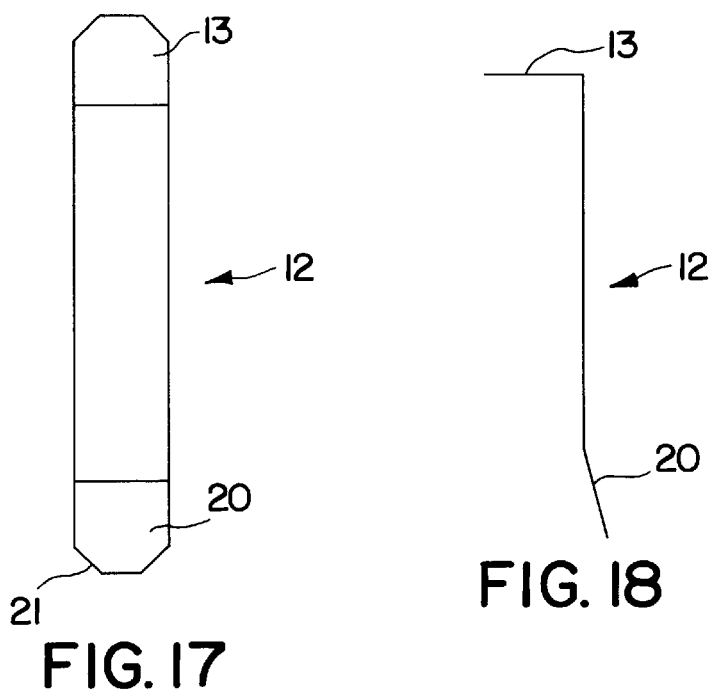
FIGS. 17 and 18 show a front view and a side view, respectively, of one possible embodiment of a securing clip.

FIGS. 17 and 18 show a front view and a side view, respectively, of one possible embodiment of the securing clip 12. This clip 12 can be about 3 inches long, with an approximately 90 degree bend at the top end, forming an engagement portion 13. This engagement portion 13 being the end of the securing clip 12 configured to engage with the cone upon the server depressing the securing clip 12. On the opposite end of the clip 12, an attachment portion 20 can be formed by making a 15 degree bend at 1/2 inch from the bottom. The four corners 21 of the clip 12 can be angled off as shown in FIG. 17.

Figure 19:
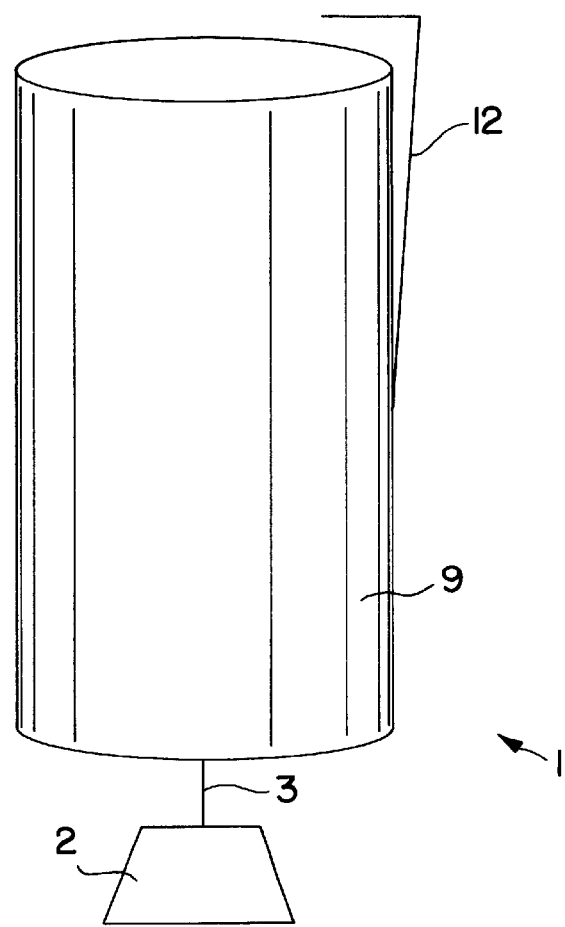
FIG. 19 schematically shows a front view of one embodiment of the inventive device in a retracted or closed position.
Figure 20B:
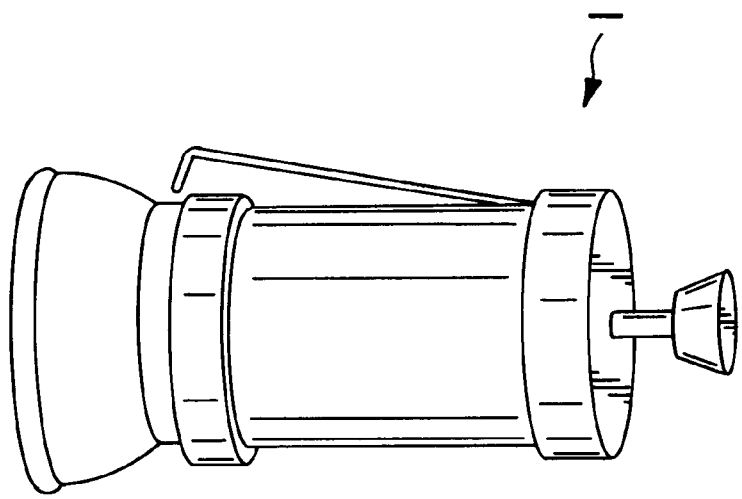
FIG. 20B shows a front view of the same embodiment as FIG. 20A, in a retracted state.
Figure 20A:
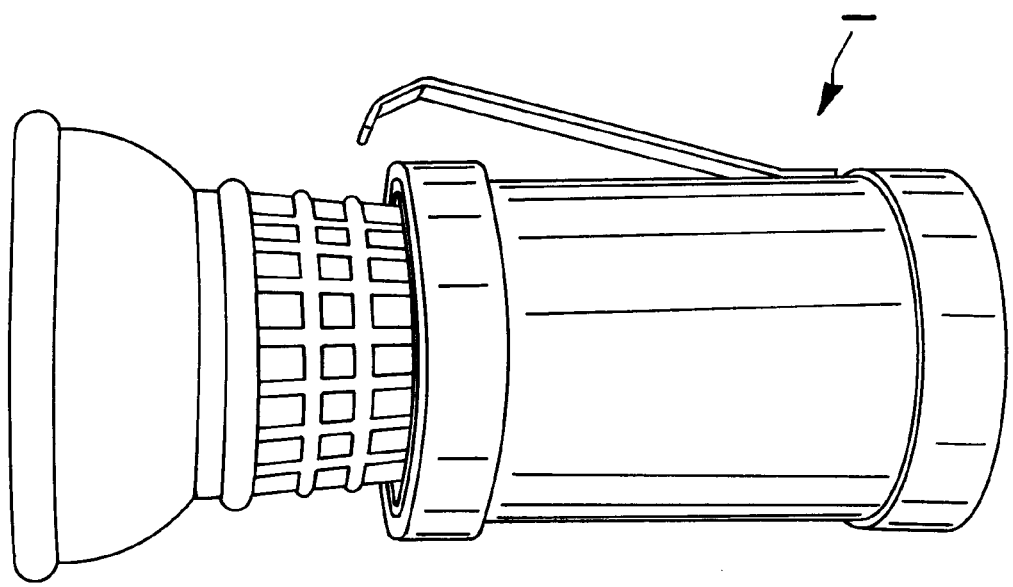
FIG. 20A shows a front view of another embodiment of the inventive device, with a cake ice cream cone therein.

FIG. 19 schematically shows a front view of one embodiment of the inventive device in a retracted or closed position and FIGS. 20A and 20B shows a front view of another embodiment of the inventive device. FIG. 20A shows the position the filled ice cream cone would be in when it is placed on a counter, for example, for service to the customer, or while additional cones are filled. FIG. 20B shows the position an ice cream cone would be in prior to, or after, filling with ice cream, for example, while still in the hand of the server. From this position the handling device 1 can either be placed on a counter (as shown in FIG. 20A), or possibly could be hung from a rack, while additional cones are filled. As can be seen from FIGS. 20A and 20B the outer surface of the handling device 1 housing 9 can be finished with a textured finish. In at least one embodiment this texturing can aid in the gripping of the housing by the hand of the server.

Figure 22:
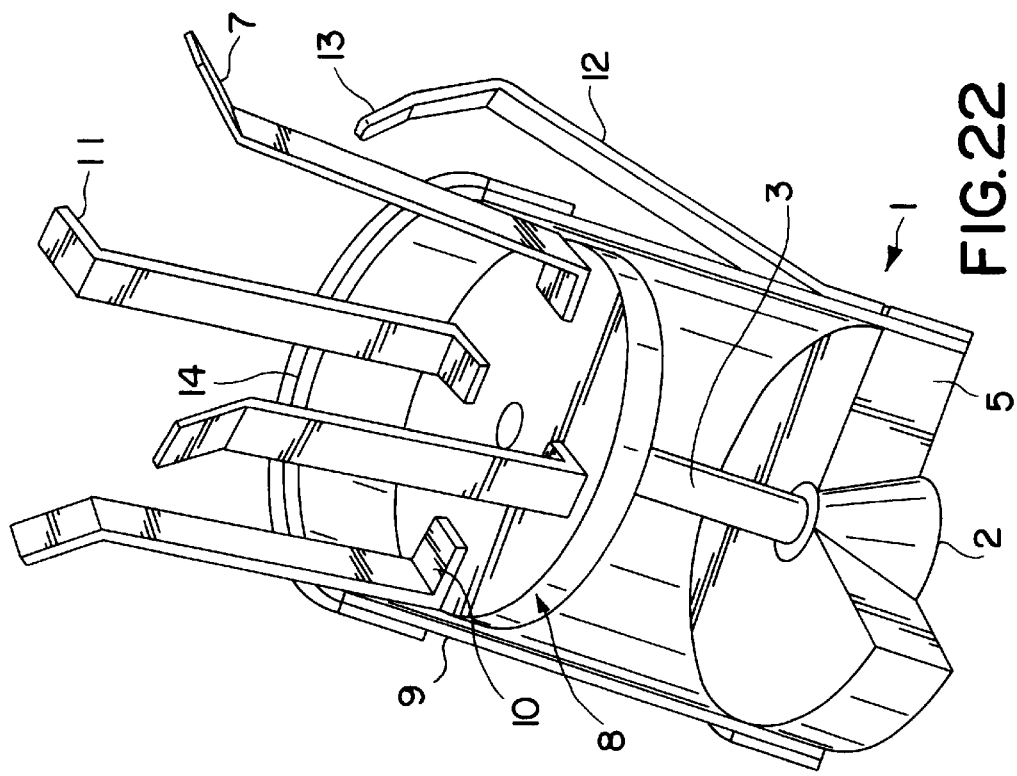
FIG. 22 shows a cross-sectional view of the same embodiment as FIG. 21, only in an extended state.
Figure 21:
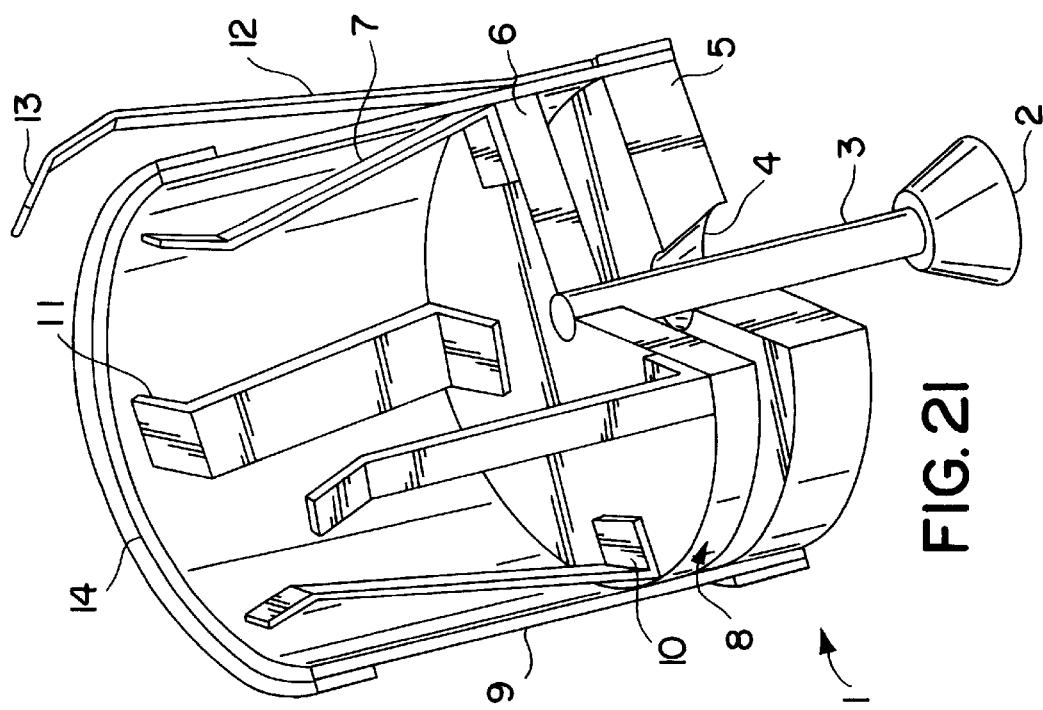
FIG. 21 shows a cross-sectional view of another possible embodiment of the present invention, in a closed or retracted state.

FIG. 21 shows a cross-sectional view of another possible embodiment of the present invention, in a closed or retracted state. FIG. 22 shows a cross-sectional view of the same embodiment as FIG. 21, only in an extended state. In this embodiment, the prongs 7 extend out of the housing 9 upon the ice cream cone handling device 1 being placed upon a surface.

Figure 24:
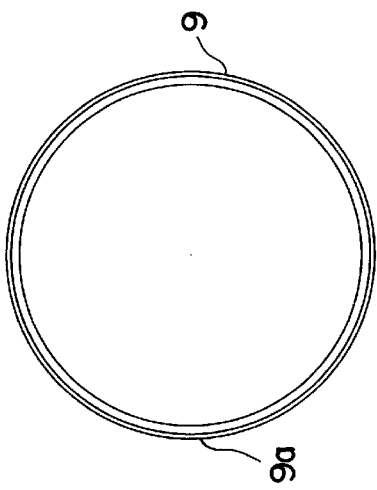
FIGS. 23 to 26 schematically show the assembly of at least one embodiment of the present invention, with additional details.
Figure 23:
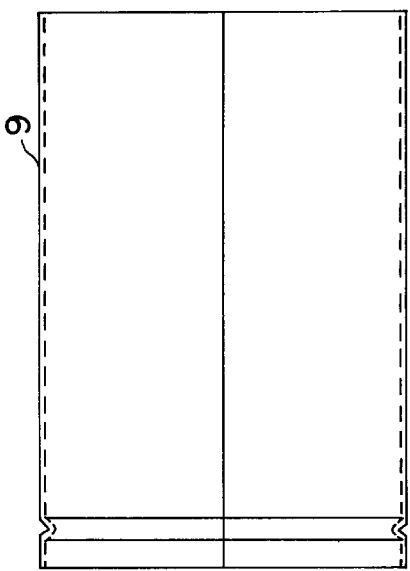

FIGS. 23 to 26 schematically show the assembly of at least one embodiment of the present invention. As shown in FIG. 23, a material, for example stainless steel, can be used with a width of only about 0.025 inches. FIG. 24 shows a top view of the housing member 9, with a seam 9a which can be formed once the housing is assembled. In at least one embodiment, for example, this seam can be held tight by the retainer rings 22a, 22b, or it is also possible to join this seam 9a, for example by welding. In at least one embodiment, it is also possible that the housing 9 could be formed without a seam.

Figure 26:
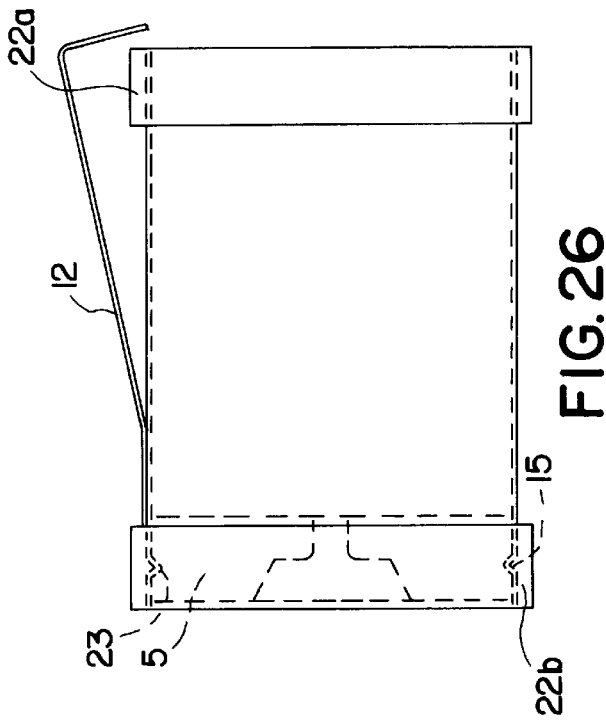
Figure 25:
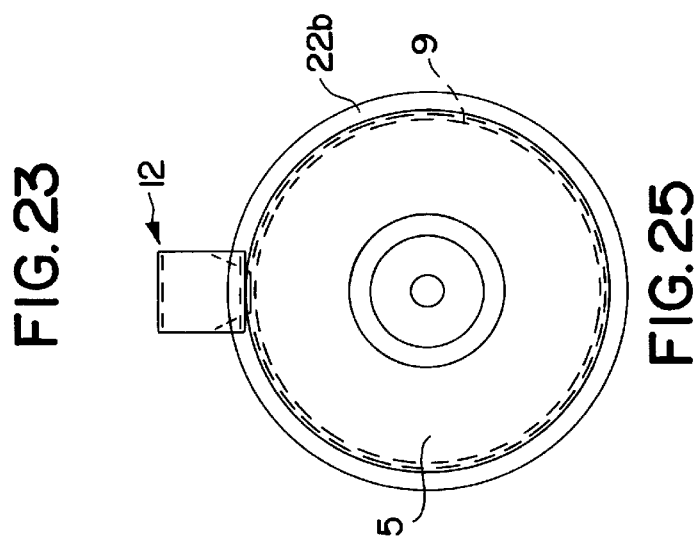

FIG. 25 shows a bottom view of at least one embodiment of the handling device 1, showing a base piece 5, the housing 9, the bottom retainer ring 22b, and the attachment of the securing clip 12. FIG. 26 shows a schematic view of the assembled device 1, after both the retainer rings 22a, 22b have been positioned. In at least one embodiment, at least a portion of this assembly can be done by machine.

Figure 27:
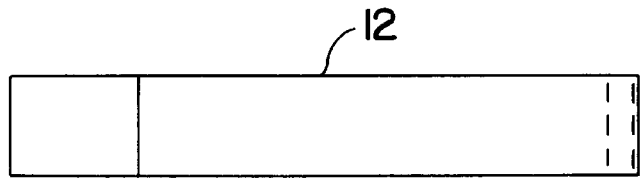
FIGS. 27, 28A, 28B and 29 show additional embodiments of the securing clip, or portions thereof.
Figure 28A:
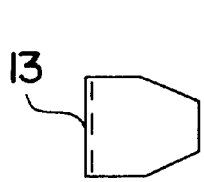
Figure 28B:
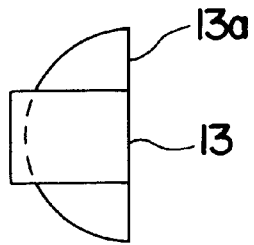
Figure 29:

FIGS. 27 to 29 show additional embodiments of the securing clip 12, with FIGS. 28A and 28B showing a top view of two different variations for the bent portion 13 which comes in contact with the cone. The entire end portion 13 can be formed as one continuous piece with the remainder of the securing clip 12, or a separate piece 13a can be attached, for example, by welding, as shown in FIG. 28B. In at least one embodiment this clip 12 can be formed from stainless steel approximately 0.025 inches in width.

Figure 30:
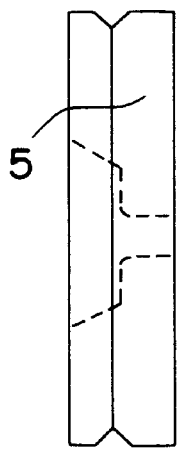
FIG. 30 shows a side view of another possible embodiment of the base piece.
Figure 31:
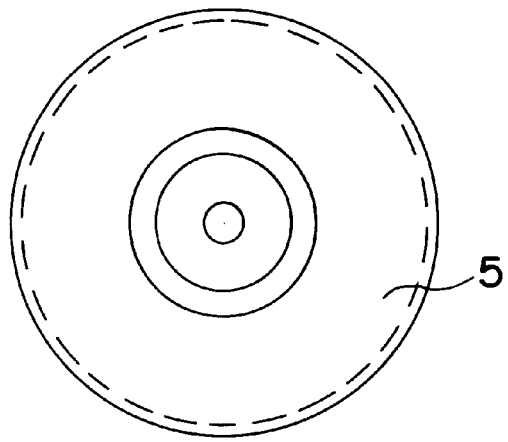
FIG. 31 shows a bottom view of the embodiment of the base piece shown in FIG. 30.

FIG. 29 shows a side view of the securing clip 12. FIG. 30 shows a side view of another possible embodiment of the base piece 5. FIG. 31 shows a bottom view of the embodiment of the base piece 5 shown in FIG. 30.

FIG. 32 shows a side view of another possible embodiment of the base piece 5, including a collar piece 24. This collar piece 24 can either be a separate piece attached to the base piece 5, or in at least one embodiment, can preferably be formed as one piece with the base piece 5. This collar piece 24 can provide added support to the plunger apparatus 8, for example when the device is in its extended state (see FIG. 2), as well as serve as a stop for the plunger platform 6. Additionally, in the shown embodiment, the recess 23, which can correspond to a similarly placed indentation 15 on the housing, can be positioned about 1/4 inch from the bottom of the base piece 5, and this recess can be about 3/16 of an inch wide.

Figure 33:
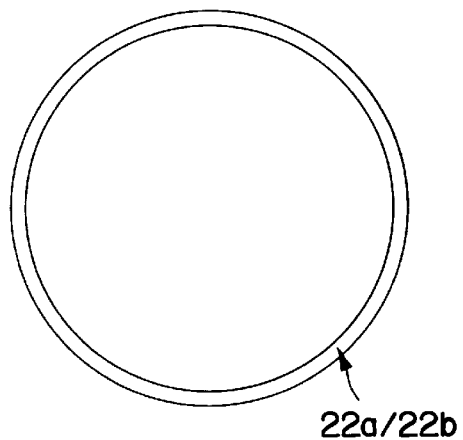
FIGS. 33 and 34 show a top view and side view of additional details of at least one possible embodiment of the retainer rings.
Figure 34:
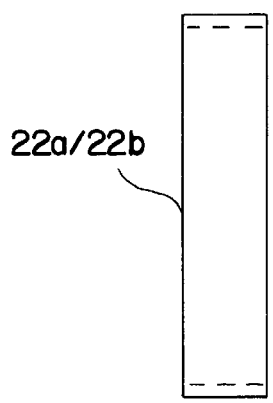

FIGS. 33 and 34 show a top view and side view of additional details of at least one possible embodiment of the retainer rings 22a, 22b. These rings 22a, 22b, for example, can also be made from stainless steel. These rings 22a, 22b can be fitted over the housing 9, and can be held in place by any of a variety of methods, such as welding or pressure fitting, for example.

Figure 35:
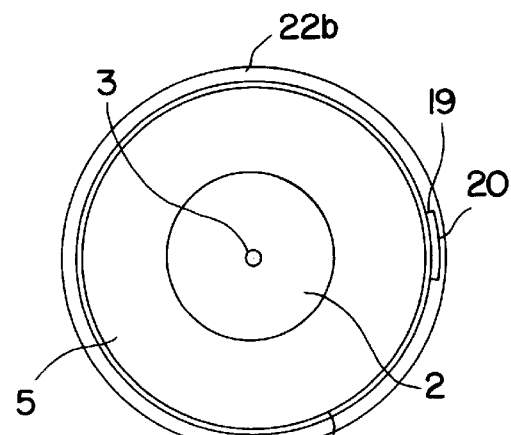
FIG. 35 shows a bottom view of one possible embodiment of the inventive device.

FIG. 35 shows a bottom view of one possible embodiment of the present invention. As shown, in this embodiment the end 20, of the securing clip 12, is positioned in the recess or groove 19 of the retainer ring 22b. In at least one embodiment, this end 20 can be attached to the retainer ring 22b by suitable means, such as welding.

One feature of the invention resides broadly in the ice cream cone handling device, comprising: a housing; said housing comprising a mouth portion for receiving at least the base of a cone; a base portion; a plunger apparatus, said plunger apparatus comprising: a platform disposed within said housing; a plurality of prongs extending from said platform; a plunger piece; a bar; said bar being disposed to extend through said base portion; said bar having a first end and a second end; said first end being connected to said platform; said second end being connected to said plunger piece; said plunger apparatus being configured and disposed to slide at least in part within said housing.

Another feature of the invention resides broadly in the ice cream cone handling device to permit sanitary handling of ice cream cones by minimizing contact with an ice cream cone by a server, comprising: a housing; said housing comprising a portion for receiving a cone; structure to hold the cone within the housing; an arrangement to permit said housing to be held by the hand of the server during the dispensing, filling and serving of a cone, thus minimizing contact with the ice cream cone by a server; said arrangement comprising apparatus to permit the cone to be elevated relative to the housing upon the device being placed upon a surface, thereby permitting the customer to lift the cone from said device; and said structure to hold the cone being configured and disposed to minimize the touching of said holding structure by the server and customer during use.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A reusable ice cream cone handling device to permit sanitary handling of ice cream cones by minimizing contact with an ice cream cone by a server, comprising:
    a housing;
    said housing comprising a mouth portion for receiving at least the base of an ice cream cone;
    a base portion;
    a plunger apparatus, said plunger apparatus comprising:
        a platform disposed within said housing;
        a plurality of prongs extending from said platform;
        said platform and said prongs together forming a cone receiving arrangement to position an ice cream cone within said housing and permit the filling of the ice cream cone with a frozen dessert;
        a plunger piece; and
        a bar;
    said bar being disposed to extend through said base portion;
    said bar having a first end and a second end;
    said first end being connected to said platform;
    said second end being connected to said plunger piece;
    said plunger apparatus being configured and disposed to slide within said housing to permit the raising and lowering of said cone receiving arrangement relative to said housing;
    said plunger apparatus having a lowered position wherein said platform is disposed substantially adjacent said base portion to permit the positioning of an ice cream cone within said cone receiving arrangement; and
    said plunger apparatus having a raised position wherein said plunger piece is disposed substantially adjacent said base portion to thus elevate an ice cream cone within said cone receiving arrangement, and to permit the removal of the ice cream cone from the handling device by a customer while minimizing contact by the customer with said handling device.

2. The ice cream cone handling device according to claim 1, comprising:
    a securing clip attached to said housing; and
    said securing clip comprising a portion configured and disposed to engage and hold an outer surface of an ice cream cone upon the ice cream cone being received by said handling device.

3. The ice cream cone handling device according to claim 2, wherein:
    said engaging and holding portion of said securing clip extends past said mouth of said handling device;
    said engaging and holding portion comprises a portion bent in a direction substantially toward said housing; and
    said housing is configured to permit the hand of a server to hold said housing, to thus minimize the touching of said cone receiving arrangement by the server during the use of said device.

4. The ice cream cone handling device according to claim 3, wherein:
    said base portion comprises a center area;
    said base portion comprises a hole disposed substantially in said center area of said base portion;
    said bar is disposed to extend through said hole;
    said plunger piece has a contoured outer surface;
    said hole comprises a contoured inner surface area; and
    said contoured inner surface area and said contoured outer surface are configured to correspond to one another to permit said base portion to receive said plunger piece upon said handling device being in said elevated position.

5. The ice cream cone handling device according to claim 4, wherein:
    each of said plurality of prongs comprise a first end and a second end disposed substantially opposite one another;

said first end of each of said prongs being attached to said platform;

said second end of each of said prongs being disposed in a direction toward said mouth of said handling device;

said second end of each of said prongs has a portion bent in a direction toward said housing; and said bent portion being disposed to assist in the guiding of a base of an ice cream cone into said cone receiving arrangement of said handling device.

6. The ice cream cone handling device according to claim 5, wherein:

said housing has an inner surface area and an outer surface area;

said base portion comprises an outer surface disposed toward said inner surface area of said housing;

said outer surface comprises a groove; and said housing comprises an indentation disposed to correspond to, and fit into, said groove to permit the securing of said base portion within said housing.

7. The ice cream cone handling device according to claim 6, wherein:

said securing clip has an engaged position wherein said bent portion of said securing clip is disposed to contact and hold an outer surface of an ice cream cone, and a disengaged position wherein said bent portion of said securing clip is disposed not to contact and hold the outer surface of an ice cream cone disposed in said handling device; and said securing clip comprises a resilient material to permit said securing clip to be moved into the engaged position by the hand of a server, and to permit the securing clip to return to the disengaged position once said securing clip is released by the hand of a server.

8. The ice cream cone handling device according to claim 7, wherein:

at least a portion of said contoured inner surface area of said base portion and said contoured outer surface of said plunger piece is substantially frustoconical in shape;

said housing is substantially cylindrical in shape;

said handling device comprises at least one retainer ring;

one of said at least one retainer ring is disposed around said outer surface of said housing, and substantially adjacent to said base portion;

said securing clip has an end disposed substantially opposite said extending portion;

said one retainer ring has a portion configured to receive said end of said securing clip;

said one retainer ring is configured and disposed to attach said securing clip to said housing;

said base portion comprises a collar piece extending in a direction toward said platform;

said collar piece being disposed in said center area of said base portion; and said collar piece is disposed to encircle said bar to thus guide said plunger apparatus.

9. A cone handling device to permit sanitary handling of cones by minimizing contact with a cone by a server during the dispensing, filling and serving of a cone, said handling device comprising:

structure to permit said handling device to be held by the hand of the server;

apparatus to receive and position a cone during the filling of the cone and the service of the cone to a customer;

an arrangement to permit said receiving and positioning apparatus to be moved between a first position and a second position;

said handling device having an upright position;

said second position being substantially above said first position upon said handling device being in the upright position;

said receiving and positioning apparatus being in said first position upon the filling of the cone;

said receiving and positioning apparatus being in said second position upon the serving of the cone, to thus elevate the cone to permit the customer to remove the cone while minimizing the touching of said handling device by the customer;

said apparatus to receive and position comprising:
a platform; and
a plurality of prongs extending from said platform;

said arrangement to permit said apparatus to receive and position to be moved between a first and second position comprising:
a plunger piece;
a bar; and
a base piece;

said bar having a first end and a second end;

said first end being connected to said platform; and said second end being connected to said plunger piece.

10. The cone handling device according to claim 9, comprising:

a securing clip; and said securing clip being configured and disposed to engage and hold an outer surface of a cone upon the cone being received by said handling device.

11. The cone handling device according to claim 10, wherein:

said base piece comprises a center area;

said base piece comprises a hole disposed substantially in said center area of said base piece;

said bar being disposed to extend through said hole;

said plunger piece has a contoured outer surface area;

said hole comprises a contoured inner surface area; and said contoured inner surface area and said contoured outer surface are configured to correspond to one another to permit said base piece to receive said plunger piece upon said handling device being placed on a surface and said receiving and positioning apparatus being in said second position.

12. The cone handling device according to claim 11, wherein:

said securing clip is attached to said structure to permit the holding of said handling device;

said structure to permit the holding of said handling device comprises a mouth portion;

said securing clip comprising a portion extending past said mouth portion;

said extending portion comprising a portion bent in a direction substantially toward said structure to permit the holding of said handling device;

said bent portion of said securing clip being configured and disposed to engage and hold an outer surface of a cone upon the cone being received by said handling device;

each of said plurality of prongs comprise a first end and a second end disposed substantially opposite one another;

said first end being attached to said platform;

said second end being disposed to extend in a direction substantially toward said mouth portion;

said second end has a portion bent in a direction toward said structure to permit the holding of said handling device; and said bent portion being disposed to assist in the guiding of a base of a cone into said apparatus to receive and position.

13. The cone handling device according to claim 12, wherein:

said structure to permit the holding of said handling device comprises a housing;

said housing has an inner surface area and an outer surface area;

said base piece comprises an outer surface disposed toward said inner surface area of said housing;

said outer surface comprises a groove; and said housing comprises an indentation disposed to correspond to, and fit into, said groove to permit the securing of said base piece within said housing.

14. The cone handling device according to claim 13, wherein:

said securing clip has an engaged position wherein said bent portion of said securing clip is disposed to contact and hold an outer surface of a cone, and a disengaged position wherein said bent portion of said securing clip is disposed not to contact and hold the outer surface of a cone disposed in said handling device; and said securing clip comprises a resilient material to permit said securing clip to be moved into the engaged position by the hand of a server, and to permit the securing clip to return to the disengaged position upon the release of once said securing clip by the hand of a server.

15. The cone handling device according to claim 14, wherein:

at least a portion of said contoured inner surface area of said base piece and said contoured outer surface of said plunger piece is substantially frustoconical in shape;

said housing is substantially cylindrical in shape;

said handling device comprises at least one retainer ring;

one of said at least one retainer ring is disposed around said outer surface of said housing, and substantially adjacent to said base piece;

said one retainer ring has an end disposed substantially opposite said bent portion;

said one retainer ring has a portion configured to receive said end of said securing clip;

said one retainer ring is configured and disposed to attach said end of said securing clip to said housing;

said base piece comprises a collar portion extending in a direction toward said platform;

said collar portion is disposed in said center area of said base piece and is substantially aligned with said hole in said base piece; and said collar portion is disposed to encircle said bar to thus guide said apparatus to receive and position and said arrangement to permit said apparatus to receive and position to be moved between a first and second position.

16. A method of using a cone handling device to permit sanitary handling of cones by minimizing contact with a cone by a server, the device comprising: structure to permit said handling device to be held by the hand of the server; apparatus to receive and position a cone during the filling of the cone and the service of the cone to a customer; an arrangement to permit the receiving and positioning apparatus to be moved between a first position and a second position; said handling device having an upright position; said second position being substantially above said first position upon said handling device being in the upright position; said receiving and positioning apparatus being in said first position upon the filling of the cone; said receiving and positioning apparatus being in said second position upon placement of said handling device upon a surface for service of the cone, to thus elevate the cone to permit the customer to remove the cone while minimizing the touching of said handling device by the customer, the method comprising the steps of:

picking up the structure to permit the holding of said handling device with the hand of a server;

minimizing contact with the cone by the server;

positioning the cone within the apparatus to receive and position a cone;

removing the cone from a stored position;

filling the cone with the desired contents; and utilizing the arrangement to permit the receiving and positioning apparatus to be moved between a first and second position to elevate the cone, thereby permitting the customer to remove the cone from the handling device while minimizing the touching of the apparatus to receive and position by the customer and server.

17. The method of using a cone handling device according to claim 16, wherein said handling device comprises a securing clip being configured and disposed to engage and hold an outer surface of a cone upon the cone being received by said handling device, and wherein the apparatus to receive and position comprises: a platform; and a plurality of prongs extending from the platform; the arrangement to permit the apparatus to receive and position to be moved between a first and second position comprises: a plunger piece; a bar; and a base piece; the bar having a first end and a second end; the first end being connected to the platform; and the second end being connected to the plunger piece, said method comprises:

the step of removing the cone from a stored position comprising the step of:

moving, with the hand of the server, the securing clip into a position to engage and hold an outer surface of the cone; and the step of utilizing the arrangement to permit the receiving and positioning apparatus to be moved between a first and second position to elevate the cone comprising the steps of:

releasing the securing clip by the hand of the server to permit the securing clip to return to a position disengaged from the outer surface of the cone; and sliding the arrangement to permit the apparatus to receive and position to be moved between a first and second position upward, to permit the apparatus to receive and position, and thus the cone, to be elevated into the second position.

18. The method of using a cone handling device according to claim 17, wherein the base piece comprises a center area; the base piece comprises a hole disposed substantially in the center area of the base piece; the bar being disposed to extend through the hole; the plunger piece has a contoured outer surface; the hole comprises a portion having a contoured inner surface area; the contoured inner surface area and the contoured outer surface are configured to correspond to one another to permit the base piece to receive the plunger piece upon the handling device being placed on a surface, the method comprising:

the step of sliding the arrangement to permit the apparatus to receive and position to be moved between a first and second position upward, comprises the step of:

sliding the arrangement to permit the apparatus to receive and position to be moved between a first and second position upward until the contoured plunger piece is received within a contoured center portion of the base piece; and the step of positioning the cone into said apparatus to receive and position comprises the step of:

having the arrangement to permit the apparatus to receive and position to be moved between a first and second position to be in a downward slid position, thus having the plunger piece disposed in a position extended away from the base piece.

19. The method of using a cone handling device according to claim 18, wherein:

said structure to permit the holding of said handling device comprises a mouth portion;

each of said plurality of prongs comprise a first end and a second end disposed substantially opposite one another;

said first end being attached to said platform;

said second end being disposed in a direction toward said mouth portion;

said second end has a portion bent in a direction toward said structure to permit the holding of said handling device;

said bent portion being disposed to assist in the guiding of a base of a cone into said apparatus to receive and position;

said structure to permit the holding of said handling device has an inner surface area and an outer surface area;

said base piece comprises an outer surface disposed toward said inner surface area of said housing;

said outer surface comprises a groove;

said structure to permit the holding of said handling device comprises an indentation disposed to correspond to, and fit into, said groove to permit the securing of said base piece within said structure to permit the holding of said handling device;

said securing clip comprising a portion extending past said mouth portion of said handling device;

said extending portion comprising a portion bent in a direction toward said structure to permit the holding of said handling device;

said bent portion of said securing clip being configured and disposed to engage and hold an outer surface of a cone upon the cone being received by said handling device;

said securing clip has an engaged position wherein said bent portion of said securing clip is disposed to contact and hold an outer surface of a cone, and a disengaged position wherein said bent portion of said securing clip is disposed not to contact and hold the outer surface of a cone disposed in said handling device;

said securing clip comprises a resilient material to permit said securing clip to be moved into the engaged position by the hand of a server, and to permit the securing clip to return to the disengaged position once said securing clip is released by the hand of a server;

said structure to permit the holding of said handling device comprises a housing;

said housing is substantially cylindrical in shape;

said handling device comprises at least one retainer ring;

one of said at least one retainer ring is disposed around said outer surface of said housing, and substantially adjacent to said base piece;

said one retainer ring having an end;

said one retainer ring having a portion configured to receive said an end of said securing clip;

said one retainer ring is configured and disposed to attach said end of said securing clip to said housing;

at least a portion of said contoured inner surface area of said base piece and said contoured outer surface of said plunger piece is frustoconical in shape;

said base piece comprises a collar portion extending in a direction toward said platform;

said collar portion being disposed in said central area of said base piece; and said collar portion is disposed to encircle said bar to thus guide said apparatus to receive and position and said arrangement to permit said apparatus to receive and position to be moved between a first and second position.

* * * * *